United States Patent
Evans et al.

(10) Patent No.: US 6,214,914 B1
(45) Date of Patent: *Apr. 10, 2001

(54) POLYETHER AMINE MODIFICATION OF POLYPROPYLENE

(75) Inventors: Randall Keith Evans, Cypress; Richard J. G. Dominguez; Richard J. Clark, both of Austin, all of TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/368,042

(22) Filed: Aug. 3, 1999

Related U.S. Application Data

(60) Division of application No. 08/676,947, filed on Jul. 8, 1996, now Pat. No. 5,959,032, which is a continuation-in-part of application No. 08/499,521, filed on Jul. 7, 1995, now Pat. No. 5,783,630, which is a continuation-in-part of application No. 08/222,508, filed on Apr. 4, 1994, now abandoned, which is a continuation of application No. 08/090,675, filed on Jul. 13, 1993, now abandoned.

(51) Int. Cl.$^7$ .......................... C08K 33/00; C08C 19/22; C08F 8/32

(52) U.S. Cl. ........................ 524/323; 524/495; 524/504; 525/63; 525/69; 525/74; 525/78; 525/80; 525/379

(58) Field of Search .................. 525/74, 63, 69, 525/78, 80, 379; 524/504, 323, 495

(56) References Cited

U.S. PATENT DOCUMENTS 5,783,630 * 7/1998 Evans et al. . 
5,959,032 * 9/1999 Evans et al. . 
5,985,999 * 11/1999 Dominguez et al. .

* cited by examiner

Primary Examiner—Veronica P. Hoke
(74) Attorney, Agent, or Firm—O'Keefe, Egan & Peterman LLP

(57) ABSTRACT

A compound comprising a blend of polypropylene with the reaction of a functionalized polypropylene and polyether amine in which the polyether amine is grafted into the functionalized polypropylene in a customary mixing apparatus is disclosed. The blend may include an elastomer such as EP rubber and/or a filler such as glass. A process for producing the reaction product of the functonalized polypropylene and the polyether amine by melting with polypropylene in a customary mixing apparatus is also disclosed. Blends of the present invention are advantageously useful to prepare paintable automotive body parts. A polyether monoamine that contains from about 36 to about 44 ethylene units and from about 1 to about 6 propylene units, and processes and blends using same.

17 Claims, No Drawings

POLYETHER AMINE MODIFICATION OF POLYPROPYLENE

This application is a divisional application of application Ser. No. 08/676,947, filed Jul. 8, 1996, now U.S. Pat. No. 5,959,032 which is a continuation-in-part application of Ser. No. 08/499,521 filed Jul. 7, 1995, now U.S. Pat. No. 5,783,630, which is a continuation-in-part of Ser. No. 08/222,508 filed Apr. 4, 1994, now abandoned, which is a continuation of Ser. No. 08/090,675, filed Jul. 13, 1993, now abandoned.

BACKGROUND OF THE INVENTION

1. Field of the Invention

This invention relates to a novel olefin polymer composed of the reaction of a functionalized polypropylene and a polyether amine. This invention also relates to thermoplastic resin blends containing the novel olefin polymer and polypropylene. This invention also relates to polyetheramines.

2. Related Art

The in situ formation of compatibilizers for polyblends is rapidly gaining popularity. In the last few years, more and more cases have been reported where advantage is taken of the presence of reactive groups to form a graft or a block or a random copolymer, which could act as a compatibilizer for a mixture of two or more polymers. The prior art, *Process Requirements of the Reactive Compatibilization of Nylon 6/Polypropylene Blends* by S. S. Dagli, M. Xanthos and J. A. Biensenberger: Polymer Processing Institute at Stevens Institute of Technology, Hoboken, N.J. 07030 reveals an acrylic acid grafted modified polypropylene used with a blend of nylon-6 and polypropylene.

Thermoplastic resin compositions containing polypropylene are well known in the art (e.g. U.S. Pat. No. 5,208,081). U.S. Pat. No. 5,179,164 describes a polypropylene/polyamide composition suitable for producing moldings. The patent describes an ethylene copolymer useful as an adhesion promoter. Moreover, the patent indicates that maleic acid is a suitable monomer for preparing the ethylene copolymer.

In addition, maleated polypropylene is commercially available.

European patent application 0 367 832 discloses a resin composition containing an olefinic polymer having acid anhydride groups. As in U.S. Pat. No. 5,179,164, the novel compound is blended with a polyamide.

Japanese patent 46003838 reveals a maleic anhydride modified polypropylene composition containing triethylamine and polyethylene glycol nonylphenyl ether. Japanese patent 60195120 reveals a molding containing polyethylene, maleic arhydride-grafted polyethylene, and diethylenetriamine.

However, the instant invention uses the maleic anhydride in conjunction with polyetherarnines which produce unexpected improvements in resin properties.

SUMMARY OF THE INVENTION

This invention is a compound comprising a blend of polypropylene ("PP") with the reaction product of a functionalized polypropylene and polyetheramine in which the polyether amine is grafted onto the functionalized polypropylene in a customary mixing apparatus. By grafted it is meant that the amine functionality of the polyetheramine reacts with the anhydride component of the functionalized polypropylene to form a reaction product, for instance, a primary amine will react with a maleic anhydride to form an imide. This invention is also a process for producing the reaction product of the functionalized polypropylene and the polyether amine by melting with polypropylene in a customary mixing apparatus. In this regard, the compound blend of this invention may be prepared by reactive extrusion by feeding a polyetheramine, a functionalized polypropylene and polypropylene into an extruder at temperatures such that the polyetheramine reacts with the functionalized polypropylene to form a reaction product containing, for example, an imide group.

This invention is also a polyether monoamine which contains from about 36 to about 44 ethylene oxide units and from about 1 to about 6 propylene oxide units. By ethylene oxide unit and propylene oxide unit it is meant the residue of ethylene oxide and propylene oxide which has been incorporated into the polyether monoamine, i.e., units corresponding to —$CH_2CH_2O$— and —$CH_2CHCH_3O$—, respectively. This invention further relates to a process for making a blend containing polypropylene and the reaction product of a functionalized polypropylene and a polyether monoamine by melting polypropylene polyether monoamine and functionalized polypropylene to form the blend. This invention is yet further directed to a blend containing polypropylene and the reaction product of polyether monoamine and functionalized polypropylene.

The compositions of the present invention are useful for preparing molded automotive body parts, including directly paintable thermoplastic polyolefins ("TPO") based automotive body parts.

It is also contemplated that the compositions are useful for making molded parts that contain filler such as glass. It is yet further contemplated that the compositions of the present invention may be useful in the preparation of films, including printable films; fibers including dyable and non-woven PP fibers; and in packaging materials for electronics components such as semiconductor chips, wherein the packaging materials may provide electrostatic dissipation which would thereby protect the chips from damage. It is yet further contemplated that the composition of the present invention may be useful to improve the barrier properties for polyethylene and to modify polyethylene as a tie layer in multilayer films. It is further contemplated that the composition of the present invention may be useful as an additive as polypropylene based reinforcement fibers for concrete.

DESCRIPTION OF THE PREFERRED EMBODIMENT

The blend of polypropylene with the reaction product of maleated polypropylene and polyether amine shows improved paintability, improved impact resistance, and excellent mold flowability over blends of polypropylene and maleated polypropylene.

Plastics are increasingly being employed in the production of motor vehicles. Impact-modified PP has proved to be particularly suitable for applications such as bumpers, spoilers, fenders, side bump strips and the like. Therefore, a thermoplastic resin blend having the improved properties of the instant invention has significant potential commercial usefulness.

These resin compositions, according to the present invention, are useful as engineering plastics which are materials for structural members in the fields of transport machines (automobiles, ships and the like), apparatus, tools, electronic appliances, electric appliances, sporting goods, leisure goods and the like; and for connectors, tubes and the like.

Suitable polypropylenes are known from polymer chemistry, are described for example in Kunststoff-Handbuch, volume IV, Polyolefins, edited by R. Vieweg, A. Schley and A. Schwarz. Carol Hanser Verlag, Munich, 1969, and are commercially available, so that no details need be given.

Functionalized PP is PP onto which a monomer has been grafted. The usual method of such grafting is by free radical reaction. In the practice of this invention, the maleated polypropylene is not a copolymer of maleic anhydride or equivalent thereof, and propylene, such that the maleic anhydride moiety is predominantly in the backbone of the copolymer. Suitable monomers for preparing functionalized polypropylene are, for example, olefinically unsaturated monocarboxylic acids of less than 12 carbon atoms, e.g., acrylic acid or methacrylic acid, and the corresponding tert-butyl esters, e.g., tert-butyl (meth)acrylate, olefinically unsaturated dicarboxylic acids of less than 12 carbon atoms, e.g., fumaric acid, maleic acid, and itaconic acid and the corresponding mono -and/or di-tert-butyl esters, e.g., mono- or di-tert-butyl fumarate and mono- or di-tert-butyl maleate, olefinically unsaturated dicarboxylic anhydrides of less than 12 carbon atoms, e.g., maleic anhydride, sulfo- or sulfonyl-containing olefinically unsaturated monomers of less than 12 carbon atoms, e.g., p-styrenesulfonic acid, 2-(meth)acrylamide-2-methylpropenesulfonic acid or 2-sulfonyl (meth)acrylate, oxazolinyl-containing olefinically unsaturated monomers of less than 12 carbon atoms, e.g., vinyloxazolines and vinyloxazoline derivatives, and epoxy-containing olefinically unsaturated monomers of less than 12 carbon atoms, e.g., glycidyl (meth)acrylate or allyl glycidyl ether. The most preferred monomer for preparing functionalized polypropylene is maleic anhydride.

The functionalized polypropylene used in the practice of this invention may have a wide variety of number average molecular weights. When the functionalized polypropylene is used to make paintable articles, such as automotive body parts, the functionalized polypropylene preferably has a number average molecular weight greater than about 3,000 and preferably less than about 20,000, more preferably less than about 10,000. A representative example of a maleated polypropylene that is currently commercially available is under the name EPOLENE E-43, available from Eastman Chemical. Such relatively low molecular weight functionalized polypropylenes, when reacted with polyetheramines in accordance with the practice of this invention, appears to render the resulting extruded compositions more readily paintable. In other applications wherein the functionalized polypropylene is employed, such as when a glass filler is added to increase stiffness and strength, a higher average number molecular weight greater than about 40,000 and less than about 60,000 may be employed. Generally, glass filler and polypropylene are not miscible, and their combination commonly leads to voids in the resulting compositions. The relatively higher molecular weight materials "wet" the glass to make the glass filler particles and polypropylene more combinable to thereby decrease the amount of voids in the resulting compositions.

Suitable anhydride functionalized polypropylene include the following structures:

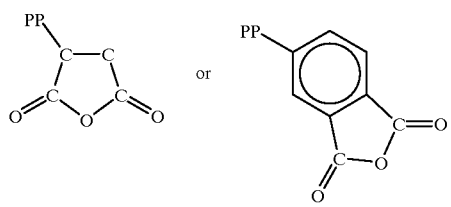

wherein PP is polypropylene. In these structures, it should be appreciated that the polypropylene can be bonded to one or two monomers when the polypropylene is linear, while more than two monomers might be included when the propylene is branched. Typically, one or two monomers are present.

Suitable polyetheramines include monoamines, diamines and triamines, having a molecular weight of from about 150 to about 12,000. Preferred polyetheramines have a molecular weight of from about 1,000 to about 3,000. Suitable monoamines, shown in the Glossary, include JEFFAMINE M-1000, JEFFAMINE M-2070, and JEFFAMINE M-2005. Suitable diamines include JEFFAMINE ED-6000, JEFFAMINE ED-4000, JEFFAMINE ED-2001, JEFFAMINE D-2000, JEFFAMINE D-4000, JEFFAMINE ED-900, JEFFAMINE ED-600, and JEFFAMINE D-400. Suitable triamines include JEFFAMINE ET-3000, JEFFAME T-3000 and JEFFAMINE T-5000. Preferred polyetheramines include JEFFAMINE M-2070 and JEFFAMINE ED-2001. More preferred polyetheramines of the present invention have a molecular weight in the range from about 1500 to about 2000. In the practice of this invention, monoamines and diamines are preferred. Suitable polyether blocks for the polyetheramine include polyethylene glycol, polypropylene glycol, copolymers of polyethylene glycol and polypropylene glycol, poly(1,2-butylene glycol), and poly(tetramethylene glycol). The glycols can be aminated using well known methods to produce the polyetheramines. Generally, the glycols are prepared from ethylene oxide, propylene oxide or combination thereof using well known methods such as by a methoxy or hydroxy initiated reaction. When both ethylene oxide and propylene oxide are used, the oxides can be reacted simultaneously when a random polyether is desired, or reacted sequentially when a block polyether is desired.

An especially preferred polyetheramine is a polyether monoamine which contains from about 36 to about 44 ethylene oxide units and from about 1 to about 6 propylene oxide units. In one embodiment, such polyether monoamines have a molecular weight of about 2000 to about 2200. In another embodiment, the polyether monoamine contains about 40 to about 43 ethylene oxide units and from about 2.4 to about 3 propylene oxide units. Certain polyether monoamines are of formula:

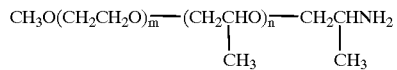

wherein m is about 36 to about 44 and wherein n is about 1 to about 6, including polyether monoamines wherein m is about 40 to about 43 and n is about 2.4 to about 3, as well as compounds of the formula having a molecular weight of about 2000 to about 2200.

In one embodiment of the present invention, the polyetheramines are prepared from ethylene oxide, propylene oxide or combinations thereof. Generally, when the polyetheramine is prepared from ethylene oxide, propylene oxide or combinations thereof, the amount of ethylene oxide on a molar basis is greater than about 50 percent of the polyetheramine, preferably greater than about 75 percent and more preferably greater than about 90 percent. In one embodiment of this invention, polyols and amines including polyalkylene polyamines and alkanol amines or any amine that is not a polyetheramine as disclosed herein may be absent from the composition. Similarly, functional groups other than ether linkages and amine groups may be absent from the polyetheramine. The polyether amines used in the practice of this invention can be prepared using well known amination techniques such as described in U.S. Pat. No. 3,654,370; U.S. Pat. No. 4,152,353; U.S. Pat. No. 4,618,717; U.S. Pat. No. 4,766,245; U.S. Pat. No. 4,960,942; U.S. Pat. No. 4,973,761; U.S. Pat. No. 5,003,107; U.S. Pat. No. 5,352,835; U.S. Pat. No. 5,422,042; and U.S. Pat. No. 5,457,147. Generally, the polyether amines are made by aminating a polyol, such as a polyether polyol with ammonia in the presence of a catalyst such as a nickel containing catalyst such as a Ni/Cu/Cr catalyst.

The mixing of the functionalized PP and polyetheramine and optionally also PP may be carried out in a customary mixing apparatus including batch mixers, continuous mixers, kneaders, and extruders. For most applications, the preferred mixing apparatus is an extruder.

Besides the PP/functionalized-PP/polyetheramine structural components according to the invention, the resin composition may, to improve the impact strength, contain impact modifiers, advantageously impact-modifying elastomers. Impact-modifying elastomers for the instant invention are known to a skilled worker. Examples are rubbers based on ethylene, propylene, butadiene, and acrylates, e.g. methacrylates, or mixtures thereof. Other examples include EP and EPDM rubbers, with EP rubber (ethylene propylene rubber) being preferred in applications where automotive body parts are being prepared. A representative example of a currently commercially available EP rubber is sold under the name VISTALON 878 by Exxon Chemical.

Suitable impact-modifying elastomers are described for example in Methoden der organischen Chemie (Houben-Weyl), volume XIV/1, Makromolekulare Chemie (Georg-Thieme-Verlag, Stuttgart, 1961), pages 390 to 406, and in the monograph by C. B. Bucknal, Toughened Plastics (Applied Publishers, London, 1977).

A composition containing polypropylene and elastomers, such as EP rubber, is commonly referred to as a "TPO," which stands for thermoplastic polyolefin. TPO's are commonly used in the manufacture of molded automotive body parts, such as bumper fascias. Such molded parts may also contain other components such as fillers, as described hereinbelow. TPO-based compositions can be prepared in the same manner as for non-elastomer-containing compositions. TPO's are commonly sold in compounded or reactor grades. Representative examples of TPO which are currently available commercially are described below in the paragraphs preceding Examples 18–29.

It is contemplated that the polyetheramine and functionalized polypropylene, and optionally a small amount of PP or TPO, can be reacted to form a reaction product concentrate and, later, the reaction product concentrate can be blended with polypropylene or TPO. In this aspect of the invention, the polyetheramine comprises from about 10 to about 50 weight percent of the concentrate. When the reaction product of polyether amine and maleated PP is prepared neat, the reaction product can be blended or compounded with polypropylene or TPO and any other components of the desired composition to the desired levels using a mixing apparatus such as an extruder. It should be understood that PP may be commonly used to dilute the reaction. Depending on the type of mixer, the reaction product, polypropylene and any other components can be thoroughly mixed as solids prior to introducing the admixture in the mixing apparatus. Alternatively, mixers are available which will mix the components during operation. In either case, during operation of the mixer, the components are heated to melt the solids, with the melted components being thereafter mixed to form the final composition.

In addition to the structural components of PP, functionalized-PP, and polyetheramine and any impact modifier contained in a resin composition according to the instant invention, the resin may also contain reinforcing agents and/or additives. The reinforcing agents used may be reinforcing fillers, for example, carbon or carbon fibers; clay, chalk, talc, and mica to control shrinkage and control coefficient of thermal expansion; glass (beads or fibers) to increase stiffness. Further, the fillers may be finished with adhesion promoters and/or sizing agents. In addition, phosphite or hindered phenol or both can be added as a stabilizer (as a free radical scavenger).

When compositions include a glass filler, the composition can contain up to about 40% glass filler if highly stiff compositions are desired. More typically, from about 2% to about 10% glass filler in the composition is employed. Advantageously, the compositions of the present invention that contain glass filler generally are substantially free of voids that typically develop in compositions containing polypropylene and glass. While not wishing to be bound by theory, it is believed that the reaction product of polyether amine and maleated polypropylene serves to "wet" the glass to thereby make the glass and polypropylene more combinable (more miscible). In this aspect of the invention, it is preferred to employ maleated polypropylene having an average molecular weight of about 40,000 to about 60,000, as is described hereinabove.

The preferred functionalized polypropylene is a maleated polypropylene having the following structure:

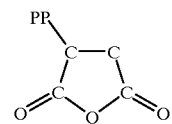

wherein PP is polypropylene.

The preferred polyetheramines are monoamines and diamines. The preferred monoamines as well as the preferred triamines have a molecular weight of from about 200 to about 4000. The preferred diamines have a molecular weight of from about 148 to about 6000. More preferred monoamines and diamines have a molecular weight of from about 1,000 to about 3,000.

The preferred reaction product between the preferred functionalized polypropylene, maleated polypropylene, and the preferred polyetheramine has the following formula:

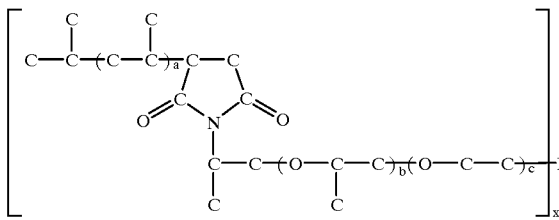

wherein a is from about 5 to 50,000, for b:c from about 0:100 to 100:0, x is from about 1 to 3, and R is hydrogen or an alkyl radical having a functionality of x (i.e., if x is 2, R is a divalent), the alkyl radical having 1 to 10 carbon atoms.

Suitable thermoplastic resin compositions may contain from about 66 to about 80 wt % PP, from about 20 to about 30 wt % maleated PP and from about 2 to about 10 wt % polyetheramine. When the compositions include elastomers, such as in TPO-based compositions used to make automotive body parts, the compositions generally comprise from about 5 to about 40 wt % maleated PP, from about 2 to about 10 wt % polyetheramine and from about 50 to about 93 wt % PP, such percentages based on the weights of these components of the composition. Preferred compositions that include elastomers comprise about 15 to about 30 wt % maleated PP, from about 2 to about 8 wt % polyetheramine and from about 62 to about 83 wt % PP.

The preferred customary mixing apparatus is an extruder in which the polyetheramine is grafted onto the maleated polypropylene at from about 175 to 300° C. in the course of a residence time of from about 25 to 300 seconds. For typical compositions of this invention, degradation begins to occur above this temperature range and below this range the compositions generally do not melt. Polypropylene is a non-reactive component of the mixing blend. The preferred temperature range is from about 190 to 260° C.

Molded articles prepared from compositions according to the present invention are generally directly paintable. Representative examples of paints commonly employed for this purpose include urethane-based and melamine-based paints. Such paints may be applied using conventional techniques. Advantageously, compositions of the present invention may be painted directly without chlorine pretreatment and optionally without primer, though a primer may be used.

In the examples, continuous compounding was carried out in a Werner & Pfleiderer 30 mm twin screw extruder (ZSK30), having a nine barrel configuration, three kneading zones and one vent section, in which the feed sequence was a combined feed in which all the components fed at the same location (hopper of the extruder).

The following examples which illustrate the nature of the instant invention are not intended to be limitative. In the examples, a stoichiometric excess of maleic functionality on the maleated polypropylene is used relative to the amount of amine functionality on the polyetheramine.

EXAMPLES 1–6

Blends of PP, maleated PP (MAL-PP), and JEFFAMINE M2070 produced in an extruder exhibit characteristics in percent compositions as shown in Table 1 in which the remaining percent is PP:

TABLE 1

| | Example | | | | | |
|---|---|---|---|---|---|---|
| | 1 | 2 | 3 | 4 | 5 | 6 |
| % MAL-PP | | 20 | | | 30 | |
| % M2070 | 0 | 2 | 4 | 0 | 2 | 4 |
| FM, psi | 284K | 255K | 226K | 289K | 256K | 201K |
| StY, psi | 8660 | 7980 | 7030 | 8750 | 7830 | 6170 |
| TE, % | 8 | 16 | 10 | 4 | 13 | 5 |
| TSt, psi | 4990 | 4770 | 4280 | 5000 | 4630 | 3720 |
| NI, ftlb/in | 0.161 | 0.220 | 0.386 | 0.123 | 0.139 | 0.220 |
| UnI, ftlb/in | 12 | 14 | 10 | 10 | 14 | 5 | where:
FM—flexural modulus
StY—stress at yield
TE—Tensile elongation
TSt—tensile strength
NI—notched izod impact
UnI—unnotched izod impact

EXAMPLES 7–10

Table 2 reveals the effects of JEFFAMINE M2070 (M) as compared to JEFFAMINE ED2001 (ED) in which either is blended with from about 76 to 78 wt % of PP, and from about 20 wt % of MAL-PP in an extruder.

TABLE 2

| | Example | | | |
|---|---|---|---|---|
| | 7 | 8 | 9 | 10 |
| J. Type | M | ED | M | ED |
| % JEFF. | 2 | | 4 | |
| FM, psi | 255K | 246K | 226K | 230K |
| StY, psi | 7980 | 7730 | 7030 | 7140 |
| TE, % | 16 | 10 | 10 | 16 |
| TSt, psi | 4770 | 4560 | 4280 | 4420 |
| NI, ftlb/in | 14 | 15 | 10 | 18 |
| UnI, ftlb/in | 14 | 15 | 10 | 18 | where:
FM—flexural modulus
StY—stress at yield
TE—Tensile elongation
TSt—tensile strength
NI—notched izod impact
UnI—unnotched izod impact

EXAMPLES 11–17

Table 3 reveals the percent paint adhesion of various compositions of PP, maleated PP, and the JEFFAMINES indicated relative to a control sample wherein the blends were produced. in an extruder.

TABLE 3

| Example | PP | MAL-PP | % J. Type | Paint Adhesion | Control |
|---|---|---|---|---|---|
| 11 | 76% | 20% | 4% JEFFAMINE M1000 | 62% | 2% |
| 12 | 76% | 20% | 4% JEFFAMINE ED-6000 | 28% | 4% |
| 13 | 74% | 20% | 6% JEFFAMINE ED-6000 | 46% | 4% |
| 14 | 74% | 20% | 6% JEFFAMINE ED-4000 | 40% | 4% |
| 15 | 74% | 20% | 6% JEFFAMINE M-2070 | 77% | 21% |
| 16 | 72% | 20% | 8% JEFFAMINE M-2070 | 40% | 21% |

TABLE 3-continued

| Example | PP | MAL-PP | % J. Type | Paint Adhesion | Control |
|---|---|---|---|---|---|
| 17 | 72% | 20% | 8% JEFFAMINE M-2001 | 68% | 21% |

In the following Examples 18–29, there are shown modified TPO-based (thermoplastic olefin-based) compositions including polyether amines of the present invention (in Tables 18A, 19A, 20A, 21A, 22A, 23A, 24A, 25A, 26A, and 27A), the physical properties of the compositions (in Tables 18B, 19B, 20B, 21B, 22B, 23B, 24B, 25B, 26B, and 27B) and the paint adhesion of the compositions (in Tables 18C, 19C, 20C, 21C, 22C, 23C, 24C, 25C, 26C, and 27C). In the Tables shown in Examples 18–29, the following phrases have the indicated meanings:

"HIMONT CA53A" is a reactor grade TPO containing polypropylene ("PP") and ethylene propylene rubber ("EP rubber") obtained from Himont, which may be described as having medium melt flow.

"Phenol" is ETHANOX 330 which is a hindered phenol stabilizer obtained from Albemarle.

"EPOLENE E-43" is a maleated PP obtained from Eastman Chemical, having about 4 wt % maleation as determined from proton nmr.

"HIMONT LB150161" is a reactor grade TPO having a high melt flow.

"AMOCO 1016" is a PP having a melt flow rate at 230° C. of about 5 g/min. as indicated by the supplier, Amoco Chemical.

"DEXFLEX D-161" is a compounded TPO of PP and EP rubber which is described as having medium melt flow by the supplier, D&S Plastics International.

"NICHIBAN" refers to the tradename of a tape obtained from a Japanese company.

"STAMYLAN P" is an impact EP copolymer containing 5–10% ethylene in the backbone obtained from DSM having a melt flow at 230° C./2.16 Kg using an 150 R1133 procedure of 4.7 dg/min. as reported by the supplier, Dutch State Mines ("DSM").

"KELTAN TP-0552-2" is a TPO having a melt flow at 230° C./2.16 Kg using an ISO R1133 procedure of 6.5 dg/min. as reported by the supplier, DSM.

"VISTALON 878" is an EP rubber available from Exxon Chemical.

"W/IPA" means with isopropanol wipe prior to painting and "W/O IPA" means without isopropanol wipe painting.

In Examples 18–29, the sample compositions were injection molded to prepare type I tensile bars, which were used in the adhesion tests. The following procedures were used in these examples.

A hand mixed blend of polypropylene, maleated polypropylene, polyether amine and an antioxidant is produced and added to the feed hopper. The extruder heater bands are set to the following profile: feed throat 200° C., 220° C., 220° C., 220° C., 220° C., 220° C. die face.

The blend is fed into the feed throat of a Werner Pfleiderer ZSK30 twin screw extruder. The compounded product is cooled in a water bath and pelletized.

Test specimens were injection molded using an ENGEL 55 ton injection molding machine using the following conditions:

Heating Zones

| Nozzle | Next to Nozzle | Feed Zone | Feed Zone |
|---|---|---|---|
| 199° C. | 196° C. | 196° C. | 196° C. |

Mold Temperature 27° C.

Physical test specimens were allowed to equilibrate at 24° C. and at 50% relative humidity for 48 hours. Tensile measurements were made according to ASTM D638 on an INSTRON frame using a crosshead speed of 10 cm/min. Flexural properties were measured according to ASTM D790 using a crosshead speed of 1.25 cm/min. Izod impact properties were measured according to ASTM D256.

Dynamical mechanical spectrometry (DMS) was performed using a RHEOMETRICS RDS-II. Injection molded bars measuring 12 mm×50 mm×3 mm were tested in rectangular torsion mode at 1 Hz. Strains imposed upon the samples were typically between 0.05% and 0.2%. Measurements were shown to be strain insensitive over the region investigated. The storage and the loss moduli as well as tan delta were measuring from −120° C. up through the melting of the samples, using a heating rate of 2° C./min. in a nitrogen atmosphere. Samples were tested after conditioning at 24° C. and 50% relative humidity for 24 hours.

Paint adhesion testing involved painting four inch injection molded discs with a white, two component urethane automotive paint supplied by RED SPOT PAINTS. The paint is applied with a high volume, low pressure BINKS spray gun. The painted disks are based for 30 minutes at 80° C. The specimens are conditioned 24 hours and then tested using a crosshatch/tape adhesion test where a multibladed scribe is used to generate 100 squares (approximately 2 mm×2 mm per square) on the disks. A piece of tape (Scotch Brand 2040, 3M) is then applied over the squares and then the tape is pulled from the disk. The percentages denoted in the tables reflect the number of painted squares remaining after pulling the tape from the disk.

TABLE 18A

| Sample | TPO[1] | MAL-PP[2] | JEFFAMINE ® M-2070 | Phenol | PP |
|---|---|---|---|---|---|
| 1 | 99.7% | — | — | 0.3% | |
| 2 | 84.7% | — | — | 0.3% | 15% |
| 3 | 79.7% | — | — | 0.3% | 20% |
| 4 | 84.7% | 15% | — | 0.3% | |
| 5 | 79.7% | 20% | — | 0.3% | |
| 6 | 80.7% | 15% | 4% | 0.3% | |
| 7 | 78.7% | 15% | 6% | 0.3% | |
| 8 | 75.7% | 20% | 4% | 0.3% | |
| 9 | 73.7% | 20% | 6% | 0.3% | |
| 10 | 71.7% | 20% | 8% | 0.3% | |
| 11 | 80.7% | 15% | 4% | 0.3% | |
| 12 | 78.7% | 15% | 6% | 0.3% | |
| 13 | 75.7% | 20% | 4% | 0.3% | |
| 14 | 73.7% | 20% | 6% | 0.3% | |
| 15 | 71.7% | 20% | 8% | 0.3% | |

[1]HIMONT CA53A
[2]EPOLENE E-43

TABLE 18B

| | 1 | 2 | 3 | 4 | 5 |
|---|---|---|---|---|---|
| Flexural Modulus, MPa | 578 | 725 | 736 | 686 | 741 |
| Stress at Yield, mPa | 19.1 | 23.3 | 24.1 | 22.6 | 24.4 |
| Tensile Elongation, % | 667 | 666 | 622 | 559 | 417 |

TABLE 18B-continued

|  | | | | | |
|---|---|---|---|---|---|
| Tensile Strength, MPa | 16.2 | 18.9 | 18.8 | 16.1 | 16.7 |
| Young's Modulus, MPa | 338 | 432 | 453 | 423 | 452 |
| Notched Izod Impact, J/m | 554 | 493 | 382 | 100 | 72.9 |
| −30° C., J/m | 55.0 | 49.4 | 43.3 | 44.3 | 34.0 |
| Unnotched Izod Impact, J/m | 839 | 1025 | 931 | 924 | 997 |
| Falling Dart Impact | | | | | |
| Max Load, J/m | 1430 | 1624 | 1652 | 1556 | 1485 |
| Total E, J | 21.6 | 23.7 | 25.6 | 23.1 | 16.0 |
| DSC | | | | | |
| Tm, ° C. | 156 | 156 | 158 | 153 | 164 |
| Delta H, J/g | 61.8 | 63.5 | 72.0 | 9.7 | 78.2 |
| Tc, ° C. | 98.9 | 103 | 104 | 102 | 109 |
| Delta H, J/g | 69.5 | 79.1 | 80.8 | 74.8 | 81.6 |

|  | 6 | 7 | 8 | 9 | 10 |
|---|---|---|---|---|---|
| Flexural Modulus, MPa | 643 | 560 | | | |
| Stress at Yield, MPa | 21.1 | 17.3 | | | |
| Tensile Elongation, % | 296 | 53 | | | |
| Tensile Strength, MPa | 15.3 | 13.2 | | | |
| Young's Modulus, MPa | 390 | 364 | | | |
| Notched Izod Impact, J/m | 154 | 363 | | | |
| −30° C., J/m | 33.2 | 33.7 | | | |
| Unnotched Izod Impact, J/m | 828 | 651 | | | |
| Falling Dart Impact | | | | | |
| Max Load, J/m | 1406 | 1064 | 1247 | 1043 | 905 |
| Total E, J | 19.1 | 11.4 | 15.9 | 11.0 | 9.59 |
| DSC | | | | | |
| Tm, ° C. | 152 | | 151 | 150 | 150 |
| Delta H, J/g | 61.6 | | 62.4 | 63.7 | 63.3 |
| Tc, ° C. | 101 | | 102 | 103 | 103 |
| Delta H, J/g | 73.7 | | 73.3 | 73.2 | 72.8 |

|  | 11 | 12 | 13 | 14 | 15 |
|---|---|---|---|---|---|
| Flexural Modulus, MPa | 586 | 572 | 579 | 596 | 648 |
| Stress at Yield, MPa | 18.2 | 17.4 | 18.5 | 18.8 | 19.8 |
| Tensile Elongation, % | 666 | 666 | 666 | 666 | 666 |
| Tensile Strength, MPa | 14.8 | 14.9 | 13.3 | 13.7 | 14.7 |
| Young's Modulus, MPa | 348 | 322 | 323 | 342 | 342 |
| Hardness Shore D | 57 | 56 | 57 | 57 | 56 |
| Notched Izod Impact, J/m | 563 | 574 | 116 | 184 | 565 |
| −30° C., J/m | 40.9 | 34.9 | 34.4 | 27.0 | 29.0 |
| Unnotched Izod Impact, J/m | 840 | 780 | 847 | 772 | 756 |
| Falling Dart Impact | | | | | |
| Max Load, J/m | 1541 | 1523 | 1505 | 1557 | 1539 |
| Total E, J | 22.8 | 23.0 | 20.7 | 21.9 | 23.0 |

TABLE 18Ci

ADHESION TEST

| | % Adhesion | | | | % Adhesion | | |
|---|---|---|---|---|---|---|---|
| SAMPLE | Test 1 | Test 2 | Test 3 | SAMPLE | Test 1 | Test 2 | Test 3 |
| PP | 0 | 0 | | PP | 0 | 2 | |
| 1 | 0 | 2 | | 1 | 0 | 0 | |
| 2 | 19 | 32 | | 2 | 0 | 1 | |
| 3 | 5 | 1 | | 3 | 1 | 5 | |
| 4 | 49 | 23 | 36 | 4 | 0 | 0 | |
| 5 | 61 | 57 | 59 | 5 | 0 | 0 | |
| 6 | 80 | 99 | 90 | 6 | 65 | 52 | 58 |
| 7 | 100 | 78 | 89 | 7 | 26 | 5 | 16 |
| 8 | 77 | 62 | 70 | 8 | 43 | 30 | 36 |
| 9 | 91 | 90 | 90 | 9 | 90 | 98 | 94 |

TABLE 18Ci-continued

ADHESION TEST

| | % Adhesion | | | | % Adhesion | | |
|---|---|---|---|---|---|---|---|
| SAMPLE | Test 1 | Test 2 | Test 3 | SAMPLE | Test 1 | Test 2 | Test 3 |
| 10 | 93 | 98 | 96 | 10 | 82 | 91 | 6 |
| | | | | 11 | 80 | 94 | 87 |

TABLE 18Cii

CROSS-HATCH ADHESION TEST

| (SAMPLE) | S1 W/IPA |
|---|---|
| 6 | 100% |
| 7 | 100% |
| 9 | 100% |
| 10 | 96% |
| 11 | 100% |
| 14 | 100% |

TABLE 18Ciii

CROSS-HATCH ADHESION TEST

| (SAMPLE) | S1 W/O IPA | S2 W/O IPA |
|---|---|---|
| 11 | 97 | 100 |
| 12 | 0 | 4 |
| 13 | 82 | 88 |
| 14 | 95 | 98 |
| 15 | 7 | 9 |

TABLE 19A

| Sample | TPO[1] | MAL-PP[2] | JEFFAMINE ® M-2070 | Phenol |
|---|---|---|---|---|
| 1 | 99.7% | — | — | 0.3% |
| 2 | 84.7% | 15% | — | 0.3% |
| 3 | 79.7% | 20% | — | 0.3% |
| 4 | 69.7% | 30% | — | 0.3% |
| 5 | 80.7% | 15% | 4% | 0.3% |
| 6 | 78.7% | 15% | 6% | 0.3% |
| 7 | 75.7% | 20% | 4% | 0.3% |
| 8 | 73.7% | 20% | 6% | 0.3% |
| 9 | 71.7% | 20% | 8% | 0.3% |
| 10 | 65.7% | 30% | 4% | 0.3% |
| 11 | 63.7% | 30% | 6% | 0.3% |
| 12 | 61.7% | 30% | 8% | 0.3% |
| 13 | 80.7% | 15% | 4% | 0.3% |
| 14 | 78.7% | 15% | 6% | 0.3% |
| 15 | 75.7% | 20% | 4% | 0.3% |
| 16 | 73.7% | 20% | 6% | 0.3% |
| 17 | 71.7% | 20% | 6% | 0.3% |
| 18 | 65.7% | 30% | 4% | 0.3% |
| 19 | 63.7% | 30% | 6% | 0.3% |
| 20 | 61.7% | 30% | 8% | 0.3% |

[1] HIMONT CA53A
[2] EPOLENE E-43

TABLE 19B

|  | 1 | 2 | 3 | 4 | 5 |
|---|---|---|---|---|---|
| Flexural Modulus, MPa | 1234 | 1314 | 1329 | 1379 | 1351 |
| Stress at Yield, MPa | 39.1 | 41.6 | 42.5 | 43.9 | 39.9 |
| Tensile Elongation, % | 186 | 59 | 18 | 10 | 159 |
| Tensile Strength, MPa | 25.3 | 25.9 | 26.4 | 26.5 | 25.1 |
| Young's Modulus, MPa | 694 | 732 | 789 | 809 | 715 |
| Notched Izod Impact, J/m | 69.3 | 47.0 | 43.3 | 25.2 | 57.2 |
| −30° C., J/m | 33.5 | 19.1 | 17.7 | 16.5 | 18.8 |
| Unnotched Izod Impact, J/m | 1413 | 1095 | 965 | 694 | 945 |
| Falling Dart Impact |  |  |  |  |  |
| Max Load, J/m | 2096 | 2148 | 1010 | 344 | 1137 |
| Total E, J | 30.9 | 29.8 | 4.69 | 1.46 | 5.70 |
| DSC |  |  |  |  |  |
| Tm, ° C. | 166 | 165 |  | 164 | 165 |
| Delta H, J/g | 86.6 | 85.8 |  | 95.2 | 94.2 |
| Tc, ° C. | 109 | 109 |  | 110 | 109 |
| Delta H, J/g | 106 | 105 |  | 104 | 99.3 |

|  | 6 | 7 | 8 | 9 | 10 | 11 |
|---|---|---|---|---|---|---|
| Flexural Modulus, MPa | 1128 | 1253 | 1108 | 1017 | 1280 | 1186 |
| Stress at Yield, MPa | 31.6 | 37 | 28.4 | 23 | 35.4 | 31.4 |
| Tensile Elongation, % | 11 | 19 | 8.8 | 8.3 | 8.3 | 6.9 |
| Tensile Strength, MPa | 20.8 | 24.1 | 20 | 17.6 | 22.8 | 20.4 |
| Young's Modulus, MPa | 661 | 708 | 677 | 624 | 742 | 701 |
| Notched Izod Impact, J/m | 72.5 | 50.4 | 47.1 | 42.2 | 26.6 | 17.7 |
| −30° C., J/m | 15.2 | 11.7 | 10.2 | 9.5 | 7.5 | 6.6 |
| Unnotched Izod Impact, J/m | 262 | 475 | 178 | 172 | 241 | 191 |
| Falling Dart Impact |  |  |  |  |  |  |
| Max Load, J/m | 630 | 356 | 329 | 368 | 219 | 220 |
| Total E, J | 3.53 | 1.63 | 2.66 | 2.37 | 1.2 | 1.23 |
| DSC |  |  |  |  |  |  |
| Tm, ° C. | 165 | 165 | 166 | 164 | 164 | 164 |
| Delta H, J/g | 93.9 | 97.3 | 95.7 | 91.4 | 97.7 | 93.5 |
| Tc, ° C. | 109 | 109 | 110 | 109 | 110 | 108 |
| Delta H, J/g | 98 | 101 | 7.1 | 96 | 101 | 97.3 |

TABLE 19C

ADHESION TEST

|  | % Adhesion | | |  | % Adhesion | | |
|---|---|---|---|---|---|---|---|
| SAMPLE | Test 1 | Test 2 | Test 3 | SAMPLE | Test 1 | Test 2 | Test 3 |
| PP[1] | 0 | 0 |  | PP | 0 | 2 |  |
| 1 | 0 | 2 |  | 1 | 0 | 0 |  |
| 2 | 19 | 32 |  | 2 | 0 | 1 |  |
| 3 | 5 | 1 |  | 3 | 1 | 5 |  |
| 4 | 49 | 23 | 36 | 4 | 0 | 0 |  |
| 5 | 61 | 57 |  | 5 | 0 | 0 |  |
| 6 | 80 | 99 | 90 | 6 | 65 | 52 | 58 |
| 7 | 100 | 78 | 89 | 7 | 26 | 5 | 16 |
| 8 | 77 | 62 | 70 | 8 | 43 | 30 | 36 |
| 9 | 91 | 90 | 90 | 9 | 90 | 98 | 94 |
| 10 | 93 | 98 | 96 | 10 | 82 | 91 | 6 |
|  |  |  |  | 11 | 80 | 94 | 87 |

|  | % Adhesion | |  | % Adhesion | |
|---|---|---|---|---|---|
| Sample | Test 1 | Test 2 | Sample | Test 1 | Test 2 |
| 13 | 0% | 0% | 13 | 0% | 0% |
| 14 | 0% | 0% | 14 | 0% | 6% |
| 15 | 1% | 0% | 15 | 20% | 1% |
| 16 | 0% | 11% | 16 | 4% | 36% |
| 17 | 0% | 0% | 17 | 0% | 3% |
| 18 | 28% | 17% | 18 | 23% | 26% |
| 19 | 22% | 13% | 19 | 13% | 11% |
| 20 | 89% | 62% | 20 | 27% | 21% |

TABLE 20A

| Sample | PP[1] | MAL-PP[2] | JEFFAMINE ® M-2070 | EP RUBBER[3] | Phenol |
|---|---|---|---|---|---|
| 1 | 74.7% | 5% | — | 20% |  |
| 2 | 69.7% | 10% | — | 20% | 0.3% |
| 3 | 59.7% | 15% | — | 25% | 0.3% |
| 4 | 70.7% | 5% | 4% | 20% | 0.3% |
| 5 | 68.7% | 5% | 6% | 20% | 0.3% |
| 6 | 66.7% | 5% | 8% | 20% | 0.3% |
| 7 | 65.7% | 10% | 4% | 20% | 0.3% |
| 8 | 63.7% | 10% | 6% | 20% | 0.3% |
| 9 | 61.7% | 10% | 8% | 20% | 0.3% |
| 10 | 55.7% | 15% | 4% | 25% | 0.3% |
| 11 | 53.7% | 15% | 6% | 25% | 0.3% |
| 12 | 51.7% | 15% | 8% | 25% | 0.3% |

[1] AMOCO 1016
[2] EPOLENE E-43
[3] VISTALON

TABLE 20B

|  | 1 | 2 | 3 | 4 |
|---|---|---|---|---|
| Flexural Modulus, MPa | 1342 | 1411 | 1333 | 1359 |
| Stress at Yield, MPa | 38.6 | 40.2 | 36.5 | 36.4 |
| Tensile Elongation, % | 168 | 140 | 173 | 451 |
| Tensile Strength, MPa | 25.2 | 25.4 | 22.7 | 22.5 |
| Young's Modulus, MPa | 731 | 750 | 699 | 671 |
| Hardness, Shore D | 66 | 69 | 64 | 67 |
| Notched Izod Impact, J/m | 108 | 59 | 107 | 338 |
| −30° C., J/m | 17.6 | 16.6 | 18.0 | 23.1 |
| Unnotched Izod Impact, J/m | 1106 | 1199 | 1311 | 1252 |
| Falling Dart Impact |  |  |  |  |
| Maximum Load, J/m | 2045 | 2035 | 1826 | 1879 |
| −30° C., J/m | 3417 | 3351 | 3122 | 2888 |
| Total Energy, J | 30.0 | 29.2 | 26.2 | 25.9 |
| −30° C., J | 41.9 | 34.6 | 39.4 | 22.2 |

|  | 5 | 6 | 7 | 8 |
|---|---|---|---|---|
| Flexural Modulus, MPa | 1070 | 1029 | 1168 | 1064 |
| Stress at Yield, MPa | 29.6 | 28.0 | 31.6 | 28.3 |
| Tensile Elongation, % | 125 | 106 | 188 | 119 |
| Tensile Strength, MPa | 19.1 | 18.1 | 19.9 | 18.2 |
| Young's Modulus, MPa | 575 | 552 | 595 | 555 |
| Hardness, Shore D | 63 | 61 | 64 | 63 |
| Notched Izod Impact, J/m | 361 | 444 | 273 | 286 |
| −30° C., J/m | 28.4 | 43.8 | 19.2 | 18.4 |
| Unnotched Izod Impact, J/m | 867 | 816 | 874 | 785 |
| Falling Dart Impact |  |  |  |  |
| Maximum Load, J/m | 1710 | 1495 | 1858 | 1338 |
| −30° C., J/m | 920 | 595 | 2101 | 385 |
| Total Energy, J | 18.5 | 14.8 | 22.8 | 13.5 |
| −30° C., J | 30.5 | 2.19 | 12.4 | 1.58 |

|  | 9 | 10 | 11 | 12 |
|---|---|---|---|---|
| Flexural Modulus, MPa | 1006 | 1078 | 968 | 915 |
| Stress at Yield, MPa | 26.4 | 28.8 | 26.4 | 24.0 |
| Tensile Elongation, % | 122 | 196 | 184 | 40 |
| Tensile Strength, MPa | 17.1 | 18.2 | 17.2 | 15.6 |
| Young's Modulus, MPa | 523 | 553 | 527 | 500 |
| Hardness, Shore D | 61 | 62 | 61 | 60 |
| Notched Izod Impact, J/m | 256 | 277 | 240 | 127 |
| −30° C., J/m | 24.0 | 25.0 | 26.4 | 13.8 |
| Unnotched Izod Impact, J/m | 729 | 904 | 860 | 782 |
| Falling Dart Impact |  |  |  |  |
| Maximum Load, J/m | 1024 | 1606 | 1317 | 1110 |
| −30° C., J/m | 339 | 1021 | 500 | 561 |
| Total Energy, J | 9.2 | 18.9 | 13.5 | 9.9 |
| −30° C., J | 1.74 | 4.31 | 2.50 | 2.69 |

TABLE 20C

CROSS-HATCH ADHESION TEST

| SAMPLE | S1 W/IPA | S2 W/IPA | S1 W/O IPA | S2 W/O IPA |
|---|---|---|---|---|
| 1 | 19% | 20% | 0% | 2% |
| 2 | 19% | 44% | 11% | 13% |
| 3 | 50% | 89% | 99% | 100% |
| 4 | 40% | 59% | 37% | 52% |
| 5 | 29% | 55% | 5% | 33% |
| 6 | 92% | 100% | 4% | 39% |
| 7 | 82% | 89% | 28% | 32% |
| 8 | 95% | 100% | 68% | 100% |
| 9 | 97% | 78% | 70% | 75% |
| 10 | 83% | 100% | 99% | 100% |
| 11 | 99% | 100% | 82% | 96% |
| 12 | 92% | 100% | 100% | 100% |

TABLE 21A

| Sample | TPO[1] | MAL-PP[2] | JEFFAMINE ® M-2070 | Phenol |
|---|---|---|---|---|
| 1 | 100% | — | — | 0.3% |
| 2 | 90% | 10% | — | 0.3% |
| 3 | 85% | 15% | — | 0.3% |
| 4 | 80% | 20% | — | — |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 80.8% | 15% | 4% | 0.2% |
| 12 | 78.8% | 15% | 6% | 0.2% |
| 13 | 75.8% | 20% | 4% | 0.2% |
| 14 | 73.8% | 20% | 6% | 0.2% |

[1]DEXFLEX D161
[2]EPOLENE E-43

TABLE 21B

|  | 1 | 2 | 3 | 4 | 5 |
|---|---|---|---|---|---|
| Flexural Modulus, MPa | 944 | 985 | 1050 | 1101 | 857 |
| Stress at Yield, MPa | 25.1 | 27.4 | 29.3 | 30.7 | 23.9 |
| Tensile Elongation, % | 506 | 186 | 116 | 78 | 466 |
| Tensile Strength, MPa | 17.8 | 18.7 | 19.5 | 20.1 | 16.8 |
| Young's Modulus, MPa | 551 | 581 | 629 | 654 | 491 |
| Hardness Shore D | 63 | 65 | 67 | 68 | 63 |
| Notched Izod Impact, J/m | 576 | 343 | 84 | 54 | 475 |
| −30° C., J/m | 35.9 | 31.5 | 25.1 | 16.9 | 33.6 |
| Unnotched Izod Impact, J/m | 1027 | 965 | 1174 | 1066 | 944 |
| Falling Dart Impact |  |  |  |  |  |
| Max Load, J/m | 1669 | 1678 | 1703 | 1721 | 1509 |
| −30° C., J/m | 2980 | 3140 | 3094 | 2880 | 2397 |
| Total E, J | 24.1 | 22.8 | 22.7 | 21.8 | 21.9 |
| −30° C., J | 36.9 | 38.0 | 29.7 | 17.0 | 28.8 |
|  | 6 | 7 | 8 | 9 | 10 |
| Flexural Modulus, MPa | 748 | 832 | 745 | 788 | 804 |
| Stress at Yield, MPa | 20.8 | 23.0 | 20.4 | 22.6 | 22.4 |
| Tensile Elongation, % | 71 | 100 | 31 | 26 | 18 |
| Tensile Strength, MPa | 14.7 | 16.1 | 14.5 | 16.3 | 15.0 |
| Young's Modulus, MPa | 445 | 486 | 451 | 492 | 460 |
| Hardness Shore D | 61 | 64 | 451 | 61 | 60 |
| Notched Izod Impact, J/m | 331 | 252 | 60 | 74 | 56 |
| −30° C., J/m | 37.8 | 22.2 | 144 | 17.2 | 18.3 |
| Unnotched Izod Impact, J/m | 736 | 737 | 22.7 | 419 | 310 |
| Falling Dart Impact 422 |  |  |  |  |  |
| Max Load, J/m | 1340 | 1408 | 1047 | 1047 | 704 |
| −30° C., J/m | 550 | 422 | 356 | 411 | 339 |
| Total E, J | 15.1 | 15.7 | 9.0 | 7.4 | 5.1 |
| −30° C., J | 1.31 | 0.82 | 0.62 | 0.70 | 0.53 |
|  | 11 | 12 | 13 | 14 |  |
| Flexural Modulus, MPa | 892 | 802 | 945 | 874 |  |
| Stress at Yield, MPa | 26.2 | 23.7 | 27.1 | 25.4 |  |
| Tensile Elongation, % | 221 | 511 | 187 | 370 |  |
| Tensile Strength, MPa | 18.1 | 16.8 | 18.3 | 17.4 |  |
| Young's Modulus, MPa | 525 | 467 | 539 | 495 |  |
| Hardness Shore D | 63 | 63 | 64 | 61 |  |
| Notched Izod Impact, J/m | 159 | 511 | 99 | 118 |  |
| −30° C., J/m | 26.6 | 25.9 | 20.6 | 18.7 |  |
| Unnotched Izod Impact, J/m | 1020 | 934 | 1174 | 913 |  |
| Falling Dart Impact |  |  |  |  |  |
| Max Load, J/m | 1610 | 1603 | 1591 | 1618 |  |
| −30° C., J/m | 2655 | 1541 | 1517 | 1259 |  |
| Total E, J | 22.4 | 23.6 | 19.1 | 19.5 |  |
| −30° C., J | 20.8 | 5.45 | 6.24 | 4.88 |  |

TABLE 21C

CROSS-HATCH ADHESION TEST

| (SAMPLE) | S1 W/IPA | S2 W/IPA | S1 W/O IPA | S2 W/O IPA |
|---|---|---|---|---|
| PP[1] | 0.00 | 0.00 | 0.00 |  |
| 1 | 3 | 18 | 78 | 27 |
| 2 | 63 | 63 | 94 | 48 |
| 3 | 79 | 59 | 62 | 100 |
| 4 | 0.00 | 14 | 87 | 83 |
| 5 | 100 | 100 | 100 | 100 |
| 6 | 100 | 100 | 100 | 100 |
| 7 | 100 | 100 | 99 | 100 |
| 8 | 100 | 100 | 97 | 100 |
| 9 | 100 | 100 | 100 | 100 |
| 10 | 100 | 100 | 100 | 100 |
| 11 | 67 | 67 | 94 | 88 |
| 12 | 62 | 62 | 10 | 22 |
| 13 | 100 | 100 | 100 | 100 |
| 14 | 100 | 100 | 100 | 100 |

[1]Control.

TABLE 22A

| Sample | TPO[1] | MAL-PP[2] | JEFFAMINE ® M-2070 | Phenol |
|---|---|---|---|---|
| 1 | 100% | — | — | — |
| 2 | 90% | 10% | — | — |
| 3 | 85% | 15% | — | — |
| 4 | 80% | 20% | — | — |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 80.8% | 15% | 4% | 0.2% |
| 12 | 78.8% | 15% | 6% | 0.2% |
| 13 | 75.8% | 20% | 4% | 0.2% |
| 14 | 73.8% | 20% | 6% | 0.2% |

[1]STAMYLAN P
[2]EPOLENE E-43

TABLE 22B

|  | 1 | 2 | 3 | 4 | 5 | 6 | 7 |
|---|---|---|---|---|---|---|---|
| Flexural Modulus, MPa | 1053 | 1123 | 1185 | 1259 | 1100 | 1025 | 1040 |
| Stress at Yield, MPa | 32.3 | 35.3 | 36.5 | 38.9 | 32.7 | 30.0 | 31.0 |
| Tensile Elongation, % | 453 | 173 | 141 | 36 | 168 | 30 | 22 |
| Tensile Strength, MPa | 21.2 | 22.7 | 23.1 | 23.7 | 21.5 | 19.9 | 20.3 |
| Young's Modulus, MPa | 568 | 647 | 665 | 696 | 581 | 571 | 592 |
| Notched Izod Impact, J/m | 716 | 607 | 159 | 118 | 519 | 482 | 219 |
| −30° C., J/m | 77.4 | 43.5 | 34.7 | 23.5 | 37.0 | 47.8 | 33.5 |
| Unnotched Izod Impact, J/m | 1075 | 1246 | 1078 | 1124 | 911 | 853 | 629 |
| Falling Dart Impact |  |  |  |  |  |  |  |
| Max Load, J/m | 1987 | 2002 | 2013 | 2052 | 1853 | 1614 | 1632 |
| −30° C.,J/m | 3562 | 3721 | 2804 | 1154 | 1464 | 461 | 503 |
| Total Energy, J | 31.4 | 31.1 | 30.0 | 28.8 | 25.9 | 17.4 | 18.1 |
| −30° C., J/m | 45.2 | 42.7 | 17.2 | 3.6 | 5.3 | 0.9 | 1.0 |

|  | 8 | 9 | 10 | 11 | 12 | 13 | 14 |
|---|---|---|---|---|---|---|---|
| Flexural Modulus, MPa | 995 | 1062 | 999 | 1107 | 1083 | 1131 | 1076 |
| Stress at Yield, MPa | 26.9 | 30.8 | 28.4 | 33.9 | 33.2 | 34.0 | 32.5 |
| Tensile Elongation, % | 14 | 15 | 11 | 218 | 483 | 80 | 230 |
| Tensile Strength, MPa | 18.3 | 19.9 | 18.5 | 21.4 | 20.1 | 21.7 | 20.8 |
| Young's Modulus, MPa | 542 | 582 | 560 | 587 | 517 | 619 | 582 |
| Notched Izod Impact, J/m | 238 | 109 | 104 | 495 | 563 | 145 | 157 |
| −30° C., J/m | 34.6 | 24.2 | 22.7 | 27.1 | 39.8 | 28.5 | 26.8 |
| Unnotched Izod Impact, J/m | 514 | 464 | 336 | 1029 | 1008 | 1004 | 863 |
| Falling Dart Impact |  |  |  |  |  |  |  |
| Max Load, J/m | 1301 | 1003 | 1021 | 2017 | 2002 | 941 | 1878 |
| −30° C.,J/m | 460 | 455 |  | 3633 | 1244 | 1140 | 1193 |
| Total Energy, J | 11.0 | 8.3 | 6.3 | 30.2 | 29.5 | 7.9 | 26.4 |
| −30° C., J/m | 0.7 | 0.7 |  | 26.8 | 3.6 | 3.2 | 3.5 |

TABLE 22C

CROSS-HATCH ADHESION TEST

| DISC SAMPLE SAMPLE | S1 3M[1] W/IPA | S2 3M W/IPA | S1 NICHIBAN W/O IPA | S2 NICHIBAN W/O IPA |
|---|---|---|---|---|
| 1 | 6% | 0% | 0% | 3% |
| 2 | 1% | 0% | 14% | 1% |
| 3 | 1% | 0% | 7% | 2% |
| 4 | 0% | 6% | 1% | 15% |
| 5 | 45% | 80% | 83% | 32% |
| 6 | 96% | 98% | 96% | 100% |
| 7 | 88% | 96% | 82% | 92% |
| 8 | 89% | 78% | 74% | 96% |
| 9 | 94% | 87% | 100% | 98% |
| 10 | 99% | 100% | 100% | 100% |
| 11 | 3% | 47% | 20% | 27% |
| 12 | 7% | 1% | 2% | 3% |
| 13 | 38% | 79% | 35% | 78% |
| 14 | 85% | 65% | 100% | 97% |

TABLE 22C-continued

CROSS-HATCH ADHESION TEST

[1]Scotch Brand 2040

| DISC SAMPLE SAMPLE | S1 W/IPA | S2 W/IPA | S1 W/O IPA | S2 W/O IPA |
|---|---|---|---|---|
| 1 | 4% | % | 5% | 0% |
| 2 | 0% | 0% | 7% | 0% |
| 3 | 4% | 0% | 4% | 10% |
| 4 | 9% | 1% | 17% | 1% |
| 5 | 26% | 79% | 57% | 46% |
| 6 | 95% | 90% | 93% | 92% |
| 7 | 95% | 89% | 94% | 89% |
| 8 | 83% | 84% | 97% | 97% |
| 9 | 85% | 94% | 98% | 96% |
| 10 | 96% | 88% | 99% | 97% |
| 11 | 83% | 58% | 90% | 71% |
| 12 | 0% | 5% | 8% | 20% |
| 13 | 86% | 95% | 74% | 92% |
| 14 | 97% | 86% | 92% | 98% |
| 15[1] | 98% | 98% | 100% | 100% |

[1]Reactive extrusion product of 73% STAMYLAN P, 20% EPOLENE E-43, JEFFAMINE ® M-2070, and 0.2% Phenol.

TABLE 23C

| Sample | PP[1] | MAL-PP[2] | JEFFAMINE ® M-2070 | EP RUBBER[3] | Phenol |
|---|---|---|---|---|---|
| 1 | 69.7% | — | — | 30% | 0.3% |
| 2 | 59.7% | 10% | — | 30% | 0.3% |
| 3 | 56.7% | 13% | — | 30% | 0.3% |
| 4 | 52.2% | 17.5% | — | 30% | 0.3% |
| 5 | 57.7% | 10% | 2% | 30% | 0.3% |
| 6 | 55.7% | 10% | 4% | 30% | 0.3% |
| 7 | 53.7% | 10% | 6% | 30% | 0.3% |
| 8 | 54.7% | 13% | 2% | 30% | 0.3% |
| 9 | 52.7% | 13% | 4% | 30% | 0.3% |
| 10 | 50.7% | 13% | 6% | 30% | 0.3% |
| 11 | 50.2% | 17.5% | 2% | 30% | 0.3% |
| 12 | 48.2% | 17.5% | 4% | 30% | 0.3% |
| 13 | 46.2% | 17.5% | 6% | 30% | 0.3% |
| 14 | 57.7% | 10% | 2% | 30% | 0.3% |
| 15 | 55.7% | 10% | 4% | 30% | 0.3% |
| 16 | 53.7% | 10% | 6% | 30% | 0.3% |
| 17 | 54.7% | 13% | 2% | 30% | 0.3% |
| 18 | 52.7% | 13% | 4% | 30% | 0.3% |
| 19 | 50.7% | 13% | 6% | 30% | 0.3% |
| 20 | 50.2% | 17.5% | 2% | 30% | 0.3% |
| 21 | 48.2% | 17.5% | 4% | 30% | 0.3% |
| 22 | 46.2% | 17.5% | 6% | 30% | 0.3% |

[1]AMOCO 1016
[2]EPOLENE E-43
[3]VISTALON 878

TABLE 23B

|  | 1 | 2 | 3 | 4 | 5 | 6 | 7 | 8 |
|---|---|---|---|---|---|---|---|---|
| Flexural Modulus, MPa | 1064 | 1095 | 1166 | 1156 | 1062 | 843 | 741 | 959 |
| Stress at Yield, MPa | 28.5 | 29.7 | 32.5 | 31.3 | 27.4 | 22.8 | 20.1 | 25.7 |

TABLE 23B-continued

|  | | | | | | | |
|---|---|---|---|---|---|---|---|
| Tensile Elongation, | 483 | 211 | 181 | 151 | 252 | 356 | 107 | 316 |
| Tensile Strength, MPa | 19.5 | 19.7 | 20.2 | 19.2 | 18.1 | 15.2 | 13.7 | 16.6 |
| Young's Modulus, MPa | 583 | 608 | 608 | 611 | 551 | 456 | 412 | 487 |
| Hardness, Shore D | 64 | 63 | 65 | 64 | 61 | 60 | 59 | 59 |
| Notched Izod Impact, J/m | 576 | 436 | 252 | 161 | 510 | 449 | 450 | 427 |
| −30° C., J/m | 58.4 | 28.0 | 22.2 | 26.0 | 33.0 | 54.3 | 54.9 | 31.4 |
| Unnotched Izod Impact, J/m | 979 | 957 | 976 | 867 | 955 | 847 | 815 | 819 |
| Falling Dart Impact | | | | | | | | |
| Max Load, J/m | 1711 | 1760 | 1710 | 1607 | 1565 | 1431 | 1199 | 1514 |
| −30° C., J/m | 3096 | 3236 | 3245 | 3177 | 3014 | 1487 | 802 | 2962 |
| Total Energy, J | 25.5 | 29.2 | 22.5 | 20.6 | 27.3 | 18.1 | 14.2 | 20.0 |
| −30° C., J | 39.1 | 41.5 | 42.6 | 37.4 | 40.1 | 6.8 | 3.6 | 19.6 |
| Ductile/5 | 5 | 5 | 5 | 5 | 5 | 5 | 5 | 5 |
| −30° C./5 | 5 | 5 | 5 | 3 | 5 | 0 | 0 | 0 |

|  | 9 | 10 | 11 | 12 | 13 | 14 | 15 | 16 |
|---|---|---|---|---|---|---|---|---|
| Flexural Modulus, MPa | 798 | 746 | 863 | 792 | 709 | 991 | 964 | 907 |
| Stress at Yield, MPa | 22.2 | 20.3 | 23.9 | 21.8 | 19.5 | 26.8 | 25.4 | 23.6 |
| Tensile Elongation, | 157 | 65 | 252 | 94 | 33 | 498 | 494 | 656 |
| Tensile Strength, MPa | 15.0 | 13.7 | 16.3 | 14.9 | 13.6 | 18.1 | 17.3 | 17.5 |
| Young's Modulus, MPa | 437 | 387 | 476 | 436 | 408 | 503 | 479 | 437 |
| Hardness, Shore D | 61 | 59 | 61 | 60 | 60 | 62 | 59 | 58 |
| Notched Izod Impact, J/m | 439 | 384 | 258 | 271 | 205 | 530 | 575 | 586 |
| −30° C., J/m | 40.9 | 31.0 | 25.5 | 28.6 | 29.8 | 49.8 | 33.9 | 56.1 |
| Unnotched Izod Impact, J/m | 818 | 679 | 712 | 778 | 665 | 1146 | 1108 | 1012 |
| Falling Dart Impact | | | | | | | | |
| Max Load, J/m | 1370 | 1224 | 1452 | 1258 | 1027 | 1649 | 1631 | 1554 |
| −30° C., J/m | 1224 | 718 | 1229 | 580 | 487 | 3098 | 3096 | 3060 |
| Total Energy, J | 16.1 | 14.6 | 18.6 | 13.9 | 11.9 | 24.0 | 23.6 | 23.8 |
| −30° C., J | 5.0 | 3.4 | 5.8 | 2.6 | 3.4 | 40.0 | 40.1 | 39.8 |
| Ductile/5 | 5 | 5 | 5 | 5 | 5 | 5 | 5 | 5 |
| −30° C./5 | 0 | 0 | 0 | 0 | 0 | 5 | 5 | 5 |

|  | 17 | 18 | 19 | 20 | 21 | 22 |
|---|---|---|---|---|---|---|
| Flexural Modulus, MPa | 986 | 946 | 921 | 964 | 922 | 889 |
| Stress at Yield, MPa | 27.2 | 25.0 | 23.5 | 26.4 | 24.8 | 23.0 |
| Tensile Elongation, % | 511 | 578 | 605 | 87 | 109 | 202 |
| Tensile Strength, MPa | 1.67 | 16.0 | 15.7 | 17.7 | 16.7 | 16.2 |
| Young's Modulus, MPa | 456 | 439 | 404 | 518 | 477 | 475 |
| Hardness, Shore D | 62 | 60 | 58 | 62 | 62 | 54 |
| Notched Izod Impact, J/m | 463 | 549 | 594 | 209 | 357 | 551 |
| −30° C., J/m | 27.7 | 30.9 | 34.1 | 19.9 | 30.2 | 24.7 |
| Unnotched Izod Impact, J/m | 996 | 922 | 804 | 899 | 1011 | 774 |
| Falling Dart Impact | | | | | | |
| Max Load, J/m | 1541 | 1602 | 1534 | 1484 | 1429 | 1418 |
| −30° C., J/m | 3199 | 3171 | 3131 | 2932 | 3215 | 3225 |
| Total Energy, J | 20.9 | 22.8 | 22.2 | 18.2 | 18.4 | 20.6 |
| −30° C., 3 | 41.6 | 41.9 | 41.4 | 24.4 | 40.6 | 41.8 |
| Ductile/5 | 5 | 5 | 5 | 5 | 5 | 5 |
| −30° C./5 | 5 | 5 | 5 | 1 | 5 | 5 |

TABLE 23C

CROSS-HATCH ADHESION TEST

| (SAMPLE) | S1 W/IPA | S2 W/IPA | S1 W/O IPA | S2 W/O IPA |
|---|---|---|---|---|
| PP[1] | 0% | | 0% | |
| 1 | 94% | 72% | 35% | 1% |
| 2 | 74% | 57% | 73% | 45% |
| 3 | 10% | 25% | 26% | 36% |
| 4 | 80% | 62% | 16% | 24% |
| 5 | 94% | 97% | 54% | 94% |

TABLE 23C-continued

CROSS-HATCH ADHESION TEST

| (SAMPLE) | S1 W/IPA | S2 W/IPA | S1 W/O IPA | S2 W/O IPA |
|---|---|---|---|---|
| 6 | 99% | 100% | 94% | 97% |
| 7 | 100% | 100% | 100% | 100% |
| 8 | 100% | 100% | 100% | 100% |
| 9 | 100% | 100% | 100% | 100% |
| 10 | 100% | 100% | 100% | 100% |
| 11 | 100% | 100% | 97% | 100% |
| 12 | 100% | 100% | 100% | 100% |
| 13 | 97% | 95% | 98% | 100% |
| 14 | 94% | 100% | 69% | 79% |
| 15 | 65% | 59% | 0% | 0% |
| 16 | 39% | 52% | 0% | 0% |
| 17 | 100% | 100% | 67% | 71% |
| 18 | 85% | 88% | 8% | 2% |
| 19 | 75% | 43% | 20% | 3% |
| 20 | 100% | 100% | 99% | 100% |
| 21 | 100% | 100% | 93% | 100% |
| 22 | 83% | 78% | 2% | 2% |

[1]Control

TABLE 24A

| Sample | TPO[1] | MAL-PP[2] | JEFFAMINE ® M-2070 | Phenol |
|---|---|---|---|---|
| 1 | 100% | — | — | — |
| 2 | 90% | 10% | — | — |
| 3 | 85% | 15% | — | — |
| 4 | 80% | 20% | — | — |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 80.8% | 15% | 4% | 02% |
| 12 | 78.8% | 15% | 6% | 0.2% |
| 13 | 75.8% | 20% | 4% | 0.2% |
| 14 | 73.8% | 20% | 6% | 0.2% |

[1]KELTAN TP 0552-2
[2]EPOLENE E-43

TABLE 24B

| | 1 | 2 | 3 | 4 | 5 | 6 | 7 |
|---|---|---|---|---|---|---|---|
| Flexural Modulus, MPa | 915 | 971 | 1034 | 1076 | 799 | 724 | 780 |
| Stress at Yield, MPa | 23.1 | 25.5 | 27.6 | 28.4 | 21.5 | 18.4 | 21.1 |
| Tensile Elongation, % | 529 | 61 | 36 | 16 | 38 | 20 | 17 |
| Tensile Strength, MPa | 15.6 | 16.1 | 16.6 | 17.0 | 14.8 | 13.4 | 14.8 |
| Young's Modulus, MPa | 504 | 534 | 570 | 588 | 459 | 432 | 461 |
| Hardness, Shore D | 61 | 61 | 63 | 64 | 58 | 56 | 58 |
| Notched Izod Impact, J/m | 669 | 551 | 160 | 111 | 486 | 402 | 413 |
| −30° C., J/m | 700 | 101 | 71.3 | 56.7 | 96.4 | 75.6 | 70.6 |
| Unnotched Izod Impact, J/m | 944 | 877 | 942 | 937 | 810 | 706 | 805 |
| Falling Dart Impact | | | | | | | |
| Max Load, J/m | 1695 | 1732 | 1399 | 1747 | 1522 | 1178 | 1453 |
| 30° C., J/m | 2912 | 3013 | 3110 | 2932 | 1389 | 529 | 839 |
| Total Energy, J | 27.8 | 26.9 | 21.0 | 22.2 | 19.0 | 14.4 | 17.8 |
| −30° C., J | 40.5 | 40.6 | 29.9 | 18.6 | 5.4 | 42 | 4.3 |
| Ductile/5 | 5 | 5 | 5 | 5 | 5 | 5 | 5 |
| −30° C./5 | 5 | 5 | 1 | 0 | 0 | 0 | 0 |

TABLE 24B-continued

| | 8 | 9 | 10 | 11 | 12 | 13 | 14 |
|---|---|---|---|---|---|---|---|
| Flexural Modulus, MPa | 718 | 812 | 760 | 863 | 798 | 871 | 845 |
| Stress at Yield, MPa | 19.0 | 21.7 | 19.9 | 22.8 | 21.6 | 23.4 | 22.9 |
| Tensile Elongation, % | 12 | 11 | 11 | 82 | 478 | 65 | 92 |
| Tensile Strength, MPa | 13.7 | 15.0 | 13.9 | 15.7 | 15.6 | 16.3 | 16.1 |
| Young's Modulus, MPa | 441 | 487 | 462 | 473 | 463 | 486 | 478 |
| Hardness, Shore D | 56 | 59 | 58 | 62 | 59 | 61 | 61 |
| Notched Izod Impact, J/m | 438 | 128 | 200 | 519 | 620 | 147 | 166 |
| −30° C., J/m | 42.3 | 38.4 | 29.1 | 61.7 | 44.1 | 50.8 | 37.7 |
| Unnotched Izod Impact, J/m | 570 | 574 | 374 | 850 | 855 | 905 | 828 |
| Falling Dart Impact | | | | | | | |
| Max Load, J/m | 1155 | 1284 | 924 | 1544 | 1579 | 1516 | 1544 |
| −30° C., J/m | 454 | 545 | 487 | 2989 | 2300 | 2287 | 1526 |
| Total Energy, J | 13.2 | 10.7 | 6.7 | 19.9 | 24.4 | 16.3 | 21.1 |
| −30° C., J | 3.4 | 2.9 | 3.6 | 22.3 | 12.0 | 10.8 | 10.4 |
| Ductile/5 | 5 | 0 | 0 | 5 | 5 | 0 | 5 |
| −30° C./5 | 0 | 0 | 0 | 0 | 0 | 0 | 0 |

TABLE 24C

CROSS-HATCH ADHESION TEST

| (SAMPLE) | S1 W/IPA | S2 W/IPA | S1 W/O IPA | S2 W/O IPA |
|---|---|---|---|---|
| PP[1] | 0% | | 0% | |
| 1 | 96% | 88% | 86% | 90% |
| 2 | 72% | 75% | 53% | 24% |
| 3 | 69% | 41% | 43% | 100% |
| 4 | 41% | 15% | 40% | 3% |
| 5 | 100% | 100% | 100% | 100% |
| 6 | 100% | 100% | 100% | 100% |
| 7 | 100% | 100% | 100% | 100% |
| 8 | 100% | 100% | 100% | 100% |
| 9 | 100% | 100% | 100% | 100% |
| 10 | 100% | 100% | 99% | 100% |
| 11 | 100% | 100% | 100% | 100% |
| 12 | 98% | 100% | 78% | 3% |
| 13 | 100% | 88% | 100% | 100% |
| 14 | 100% | 100% | 100% | 100% |
| 15[2] | 100% | 100% | | |

[1]Control
[2]Reactive extrusion product of 73% STAMYLAN P, 20% EPOLENE E-43, 6% JEFFAMINE ® M-2070, and 0.2% Phenol.

TABLE 25A

| Sample | PP[1] | MAL-PP[2] | AMINE[3] | EP RUBBER[4] | Phenol |
|---|---|---|---|---|---|
| 1 | 74.7% | 5% | — | 20% | 0.3% |
| 2 | 69.7% | 10% | — | 20% | 0.3% |
| 3 | 59.7% | 15% | — | 25% | 0.3% |
| 4 | 70.7% | 5% | 4% | 20% | 0.3% |
| 5 | 68.7% | 5% | 6% | 20% | 0.3% |
| 6 | 66.7% | 5% | 8% | 20% | 0.3% |
| 7 | 65.7% | 10% | 4% | 20% | 0.3% |
| 8 | 63.7% | 10% | 6% | 20% | 0.3% |
| 9 | 61.7% | 10% | 8% | 20% | 0.3% |
| 10 | 55.7% | 15% | 4% | 25% | 0.3% |
| 11 | 53.7% | 15% | 6% | 25% | 0.3% |
| 12 | 51.7% | 15% | 8% | 25% | 0.3% |

[1]AMOCO 1016
[2]EPOLENE E-43
[3]A polyether monoamine containing 40 ethylene oxide units and 2.4 propylene oxide units, generally of the formula shown in the Glossary for JEFFAMINE ® M-2070
[4]VISTALON 878

TABLE 25B

|  | 1 | 2 | 3 | 4 | 5 | 6 |
|---|---|---|---|---|---|---|
| Flexural Modulus, MPa | 1233 | 1218 | 1134 | 1197 | 1098 | 994 |
| Stress at Yield, MPa | 35.1 | 35.2 | 31.7 | 33.0 | 30.9 | 28.6 |
| Tensile Elongation, % | 189 | 182 | 148 | 159 | 262 | 116 |
| Tensile Strength, MPa | 23.7 | 23.6 | 21.3 | 22.0 | 20.3 | 18.4 |
| Young's Modulus, MPa | 642 | 648 | 612 | 618 | 580 | 527 |
| Hardness, Shore D | 64 | 65 | 63 | 65 | 63 | 62 |
| Notched Izod Impact, J/m | 128 | 82 | 100 | 282 | 451 | 470 |
| −30° C., J/m | 15.2 | 16.2 | 17.2 | 16.0 | 15.6 | 23.1 |
| Unnotched Izod Impact, J/m | 1056 | 1237 | 1144 | 1091 | 969 | 981 |
| Falling Dart Impact |  |  |  |  |  |  |
| Max Load, J/m | 1915 | 1848 | 1728 | 1788 | 1753 | 1408 |
| −30° C., J/m | 3480 | 3496 | 3325 | 2495 | 2191 | 479 |
| Total Energy, J | 27.0 | 25.2 | 22.2 | 22.9 | 22.5 | 14.2 |
| −30° C., J | 43.5 | 40.0 | 42.2 | 20.4 | 9.6 | 2.0 |
| Ductile/5 | 5 | 5 | 5 | 5 | 5 | 5 |
| −30° C./5 | 5 | 4 | 5 | 2 | 0 | 0 |

|  | 7 | 8 | 9 | 10 | 11 | 12 |
|---|---|---|---|---|---|---|
| Flexural Modulus, MPa | 1161 | 1029 | 970 | 976 | 922 | 910 |
| Stress at Yield, MPa | 32.1 | 29.2 | 28.5 | 26.8 | 25.6 | 25.3 |
| Tensile Elongation, % | 374 | 240 | 118 | 376 | 474 | 185 |
| Tensile Strength, MPa | 20.5 | 18.9 | 18.3 | 17.7 | 16.0 | 17.0 |
| Young's Modulus, MPa | 570 | 552 | 521 | 505 | 469 | 486 |
| Hardness, Shore D | 64 | 61 | 60 | 61 | 60 | 60 |
| Notched Izod Impact, J/m | 366 | 383 | 315 | 391 | 425 | 341 |
| −30° C., J/m | 17.9 | 16.8 | 19.2 | 20.2 | 19.8 | 17.6 |
| Unnotched Izod Impact, J/m | 893 | 781 | 854 | 857 | 799 | 827 |
| Falling Dart Impact |  |  |  |  |  |  |
| Max Load, J/m | 1787 | 1449 | 1046 | 1546 | 1252 | 995 |
| −30° C., J/m | 3079 | 588 | 542 | 1668 | 676 | 492 |
| Total Energy, J | 23.5 | 14.8 | 10.2 | 18.4 | 13.2 | 10.0 |
| −30° C., J | 20.8 | 2.6 | 2.6 | 7.0 | 2.6 | 2.2 |
| Ductile/5 | 5 | 5 | 5 | 5 | 5 | 5 |
| −30° C./5 | 0 | 0 | 0 | 0 | 0 | 0 |

TABLE 25C

CROSS-HATCH ADHESION TEST

| DISC SAMPLE | S1 | S2 | S1 | S2 |
|---|---|---|---|---|
| TAPE | 3M[1] | 3M | NICHI-BAN | NICHI-BAN |
| SAMPLE | W/O IPA | W/O IPA | W/O IPA | W/O IPA |
| PP[2] | 0% |  | 1% |  |
| 1 | 8% | 4% | 1% | 12% | 49% |
| 2 | 1% | 2% | 4% | 39% | 43% |
| 3 | 87% | 90% | 91% | 97% | 100% |
| 4 | 49% | 53% | 57% | 87% | 95% |
| 5 | 98% | 98% | 97% | 100% | 100% |
| 6 | 99% | 100% | 100% | 100% | 100% |
| 7 | 100% | 100% | 99% | 100% | 100% |
| 8 | 98% | 99% | 100% | 100% | 100% |
| 9 | 100% | 100% | 100% | 100% | 100% |
| 10 | 100% |  | 100% | 100% | 100% |
| 11 | 100% |  | 100% | 100% | 100% |
| 12 | 100% |  | 100% | 100% | 100% |

[1]Scotch Brand 2040
[2]Control

TABLE 26A

| Sample | TPO[1] | MAL-PP[2] | JEFFAMINE ® M-2070 | Phenol |
|---|---|---|---|---|
| 1 | 100% | — | — | — |
| 2 | 90% | 10% | — | — |
| 3 | 85% | 15% | — | — |
| 4 | 80% | 20% | — | — |
| 5 | 85.8% | 10% | 4% | 0.2% |
| 6 | 83.8% | 10% | 6% | 0.2% |
| 7 | 80.8% | 15% | 4% | 0.2% |
| 8 | 78.8% | 15% | 6% | 0.2% |
| 9 | 75.8% | 20% | 4% | 0.2% |
| 10 | 73.8% | 20% | 6% | 0.2% |
| 11 | 80.8% | 15% | 4% | 0.2% |
| 12 | 78.8% | 15% | 6% | 0.2% |
| 13 | 75.8% | 20% | 4% | 0.2% |
| 14 | 73.8% | 20% | 6% | 0.2% |

[1]KELTAN TP 2632
[2]EPOLENE E-43

TABLE 26B

|  | 1 | 2 | 3 | 4 | 5 | 6 | 7 |
|---|---|---|---|---|---|---|---|
| Flexural Modulus, MPa | 1648 | 1838 | 1863 | 1895 | 1537 | 1314 | 1415 |
| Stress at Yield, MPa | 26.9 | 32.7 | 33.9 | 34.2 | 27.5 | 23.8 | 25.7 |
| Tensile Elongation, % | 93 | 6 | 4 | 2 | 9 | 9 | 6 |
| Tensile Strength, MPa | 15.9 | 18.7 | 19.0 | 18.9 | 17.0 | 15.4 | 15.9 |
| Young's Modulus, MPa | 876 | 1007 | 1065 | 1080 | 881 | 779 | 802 |
| Hardness, Shore D | 63 | 64 | 64 | 64 | 62 | 57 | 60 |
| Notched Izod Impact, J/m | 518 | 56 | 98 | 23 | 126 | 204 | 63 |
| −30° C., J/m | 146 | 36 | 24 | 14 | 27 | 32 | 19 |
| Unnotched Izod Impact, J/m | 1147 | 923 | 691 | 327 | 920 | 508 | 417 |
| Falling Dart Impact |  |  |  |  |  |  |  |
| Max Load, J/m | 1496 | 1644 | 1628 | 1222 | 1408 | 1044 | 916 |
| −30° C., J/m | 2499 | 2662 | 2371 | 799 | 1040 | 597 | 566 |
| Total Energy, J | 22.0 | 21.1 | 20.1 | 9.72 | 16.7 | 10.1 | 8.45 |
| −30° C., J | 34.7 | 21.6 | 13.1 | 5.14 | 3.61 | 3.15 | 2.96 |
| Ductile/5 | 5 | 5 | 5 | 0 | 3 | 5 | 0 |
| −30° C./5 | 5 | 0 | 0 | 0 | 0 | 0 | 0 |

|  | 8 | 9 | 10 | 11 | 12 | 13 | 14 |
|---|---|---|---|---|---|---|---|
| Flexural Modulus, MPa | 1285 | 1439 | 1261 | 1356 | 1173 | 1479 | 1323 |
| Stress at Yield, MPa | 22.8 | 25.8 | 22.6 | 27.6 | 26.1 | 28.7 | 27.0 |
| Tensile Elongation, % | 6 | 4 | 5 | 8 | 10 | 4 | 6 |
| Tensile Strength, MPa | 15.0 | 16.4 | 14.9 | 17.7 | 17.4 | 17.4 | 17.0 |
| Young's Modulus, MPa | 767 | 887 | 777 | 738 | 663 | 862 | 743 |
| Hardness, Shore D | 59 | 60 | 60 | 62 | 60 | 61 | 59 |
| Notched Izod Impact, J/m | 58 | 27 | 31 | 55 | 92 | 32 | 40 |
| −30° C., J/m | 16 | 13 | 12 | 22 | 22 | 15 | 18 |
| Unnotched Izod Impact, J/m | 313 | 334 | 222 | 691 | 812 | 632 | 771 |
| Falling Dart Impact |  |  |  |  |  |  |  |
| Max Load, J/m | 719 | 492 | 334 | 1548 | 1555 | 929 | 1207 |
| −30° C., J/m | 518 | 487 | 472 | 1923 | 1161 | 616 | 812 |
| Total Energy, J | 5.92 | 4.02 | 2.71 | 18.9 | 19.0 | 7.08 | 10.8 |
| −30° C., J | 3.07 | 2.63 | 2.82 | 7.76 | 5.34 | 3.85 | 4.02 |
| Ductile/5 | 0 | 0 | 0 | 4 | 5 | 0 | 0 |
| −30° C./5 | 0 | 0 | 0 | 0 | 0 | 0 | 0 |

TABLE 26C

CROSS-HATCH ADHESION TEST

| DISC SAMPLE | S1 | S2 | S1 | S2 |
|---|---|---|---|---|
| TAPE SAMPLE | 3M[1] W/IPA | 3M W/IPA | NICHIBAN W/O IPA | NICHIBAN W/O IPA |
| PP[2] | 0% |  | 0% |  |
| 1 | 77% | 84% | 65% | 92% |
| 2 | 32% | 0% | 22% | 5% |
| 3 | 1% | 4% | 8% | 8% |
| 4 | 0% | 0% | 7% | 13% |
| 5 | 100% | 100% | 99% | 96% |
| 6 | 100% | 100% | 100% | 100% |
| 7 | 100% | 100% | 95% | 82% |
| 8 | 100% | 100% | 88% | 100% |
| 9 | 99% | 98% | 100% | 100% |
| 10 | 100% | 100% | 100% | 100% |
| 11 | 100% | 96% | 100% | 93% |
| 12 | 74% | 19% | 57% | 77% |
| 13 | 83% | 62% | 100% | 64% |
| 14 | 91% | 84% | 91% | 93% |

[1]Scotch Brand 2040
[2]Control

TABLE 27A

| Sample | TPO[1] | MAL-PP[2] | AMINE[3] | Phenol | PP[4] |
|---|---|---|---|---|---|
| 1 | 99.7% | — | — | 0.3% |  |
| 2 | 84.7% | — | — | 0.3% | 15% |
| 3 | 79.7% | — | — | 0.3% | 20% |
| 4 | 89.7% | 10% | — | 0.3% |  |
| 5 | 84.7% | 15% | — | 0.3% |  |
| 6 | 79.7% | 20% | — | 0.3% |  |
| 7 | 85.7% | 10% | 4% | 0.3% |  |
| 8 | 83.7% | 10% | 6% | 0.3% |  |
| 9 | 80.7% | 15% | 4% | 0.3% |  |
| 10 | 78.7% | 15% | 6% | 0.3% |  |
| 11 | 75.7% | 20% | 4% | 0.3% |  |
| 12 | 73.7% | 20% | 6% | 0.3% |  |
| 13 | 71.7% | 20% | 8% | 0.3% |  |

[1]HIMONT CA53A
[2]EPOLENE E-43
[3]A polyether monoamine containing 40 ethylene oxide units and 2.4 propylene oxide units, generally of the formula shown in the Glossary for JEFFAMINE ® M-2070, and which is referred to as "XTJ-418" within Huntsman Corporation.
[4]AMOCO 1016

TABLE 27B

|  | 1 | 2 | 3 | 4 | 5 | 6 | 7 |
|---|---|---|---|---|---|---|---|
| Flexural Modulus, MPa | 510 | 646 | 705 | 588 | 664 | 734 | 546 |
| Stress at Yield, MPa | 15.8 | 19.8 | 21.4 | 18.7 | 20.6 | 22.7 | 17.2 |
| Tensile Elongation, % | 666 | 666 | 666 | 666 | 666 | 484 | 531 |
| Tensile Strength, MPa | 14.6 | 17.0 | 18.1 | 14.6 | 14.6 | 15.5 | 12.3 |
| Young's Modulus, MPa | 284 | 368 | 394 | 340 | 375 | 414 | 310 |
| Hardness, Shore D | 58 | 60 | 60 | 59 | 61 | 62 | 57 |
| Notched Izod Impact, J/m | 589 | 582 | 597 | 529 | 398 | 94 | 499 |
| −30° C., J/m | 65 | 47 | 38 | 38 | 37 | 37 | 40 |
| Unnotched Izod Impact, J/m | 722 | 867 | 841 | 727 | 882 | 958 | 704 |
| Falling Dart Impact |  |  |  |  |  |  |  |
| Max Load, J/m | 1428 | 1589 | 1632 | 1486 | 1513 | 1529 | 1334 |
| −30° C., J/m | 3007 | 3335 | 3506 | 3290 | 3278 | 2610 | 889 |
| Total Energy, J | 20.6 | 22.6 | 23.4 | 20.9 | 20.6 | 21.1 | 16.0 |
| −30° C., J | 39.4 | 39.3 | 44.6 | 43.0 | 38.5 | 18.0 | 3.7 |
| Ductile/5 | 5 | 5 | 5 | 5 | 5 | 5 | 5 |
| −30° C./5 | 5 | 4 | 5 | 5 | 4 | 0 | 0 |

|  | 8 | 9 | 10 | 11 | 12 | 13 |
|---|---|---|---|---|---|---|
| Flexural Modulus, MPa | 502 | 529 | 618 | 603 | 591 | 653 |
| Stress at Yield, MPa | 16.4 | 16.9 | 18.6 | 18.8 | 18.5 | 19.6 |
| Tensile Elongation, % | 208 | 245 | 170 | 138 | 37 | 43 |
| Tensile Strength, MPa | 11.7 | 12.2 | 13.0 | 13.5 | 13.5 | 13.8 |
| Young's Modulus, MPa | 299 | 309 | 355 | 348 | 354 | 381 |
| Hardness, Shore D | 52 | 58 | 57 | 52 | 57 | 59 |
| Notched Izod Impact, J/m | 443 | 437 | 445 | 310 | 162 | 90 |
| −30° C., J/m | 46 | 35 | 36 | 28 | 25 | 22 |
| Unnotched Izod Impact, J/m | 601 | 642 | 834 | 871 | 732 | 789 |
| Falling Dart Impact |  |  |  |  |  |  |
| Max Load, J/m | 1180 | 1255 | 1207 | 1263 | 1205 | 908 |
| −30° C., J/m | 760 | 2344 | 1505 | 1018 | 911 | 688 |
| Total Energy, J | 12.9 | 14.1 | 14.2 | 14.4 | 13.2 | 7.0 |
| −30° C., J | 3.2 | 12 | 6.3 | 3.3 | 3.1 | 3.1 |
| Ductile/5 | 5 | 5 | 5 | 5 | 5 | 0 |
| −30° C./5 | 0 | 0 | 0 | 0 | 0 | 0 |

TABLE 27C

CROSS-HATCH ADHESION TEST

| DISC SAMPLE | S1 | S2 | S1 | S2 |
|---|---|---|---|---|
| TAPE SAMPLE | 3M[1] W/O IPA | 3M W/O IPA | NICHIBAN W/O IPA | NICHIBAN W/O IPA |
| PP[2] | 5% |  | 2% |  |
| 1 | 29% | 67% | 74% | 92% |
| 2 | 66% | 76% | 81% | 84% |
| 3 | 61% | 73% | 78% | 61% |
| 4 | 100% | 98% | 100% | 98% |
| 5 | 96% | 100% | 100% | 99% |
| 6 | 85% | 94% | 91% | 96% |
| 7 | 100% | 100% | 100% | 100% |
| 8 | 100% | 100% | 100% | 100% |
| 9 | 100% | 100% | 100% | 100% |
| 10 | 100% | 100% | 100% | 100% |
| 11 | 100% | 100% | 100% | 100% |
| 12 | 100% | 100% | 100% | 100% |
| 13 | 100% | 100% | 100% | 100% |

[1]Scotch Brand 2040
[2]Control

Examples 18–27 demonstrate that TPO modified with the reaction product of maleated PP and polyether amines of this invention provides a composition that is directly paintable. This paintability is surprising and unexpected in that the TPO's used to make automotive body parts, such as bumper fascias, are not directly readily paintable to a commercially acceptable level. Heretofore, in order to render automotive TPO based molded body parts paintable, the parts were treated with an adhesion promoter comprised of low molecular weight chlorinated polyethylene and a solvent, which results in a toxic waste stream that must be properly disposed of, and which adds to the cost of the parts. Alternatively, the parts could be heat treated using plasma irradiation, or otherwise partially burning the surface of the parts. This procedure is also expensive and may be, moreover, prone to variability in result owing to batch to batch variances from procedure and errors by the operator.

Compositions prepared in accordance with the practice of the present invention generally may be directly painted, with or without a primer, such that the paint adhesion is greater than about 75 percent based on the testing procedure described above for Examples 18–27, preferably greater than about 85 percent, more preferably greater than about 90 percent, and most preferably greater than about 95 percent.

Compositions prepared in accordance with the present invention may be used to prepare molded articles of manufacture using conventional, well known, molding techniques under standard conditions. For instance, standard injection molding techniques can be employed. Certain compositions (blends) of the present invention have surprisingly been found to have improved flowability characteristics during injection molding of TPO-based compositions such that less pressure may be used when injecting the melted compositions into a mold, as compared to compositions in which polyetheramine is absent. The desired shape of the molded article may vary depending on end use of the article. For instance, rubber containing compositions of the present invention may be injection molded to manufacture automotive body parts such as bumper fascias.

EXAMPLE 28

A polyol was prepared by ethoxylation of methanol (ethylene oxide/methanol mole ratio of about 43:1), followed by propoxylation with approximately three moles of propylene oxide to yield a polyol that analyzed as 0.474 meq/g total acetylatables (2110 g/equivalent). To a tubular reactor containing 594 g of an amination catalyst, there was simultaneously fed 1.0 lb/hr of the polyol, 1.25 lb/hr of ammonia, 42 lb/hr (STP) hydrogen. The reactor was maintained at 208° C. and 2000 psig. The effluent was collected and stripped of ammonia, water and light materials and analyzed as follows: 0.473 meq/g total acetylatables, 0.454 meq/g total amine, and 0.450 meq/g primary amine. The polyether monoamine so formed contained about 43 ethylene oxide units and had an equivalent weight of about 2110. This polyether monoamine is referred to herein as "XTJ-418."

EXAMPLE 29

Blends containing the polyether monoamine of Example 28 were prepared having the components and properties as denoted in Tables 29A and 29B. In Table 29A, compositions containing polypropylene, maleated PP (HIMONT CA53A) and amines were employed. In Table 29B, TPO-based compositions are used. In the Tables 29A–29B, the JEFFAMINE M-2070 designates a polyether monoamine containing 10 propylene oxide units and 32 ethylene oxide units. The data points for JEFFAMINE M-2070 are intended to be for comparative purposes, as contrasted with the data for XTJ-418.

TABLE 29A

PP-BASED COMPOSITIONS

| | | | | | | | | | | | |
|---|---|---|---|---|---|---|---|---|---|---|---|
| Maleated-PP (%) | 20 | 20 | 20 | 20 | 20 | 20 | 30 | 30 | 30 | 30 | 30 |
| XTJ-418 (%) | 4 | | 6 | | 8 | | 4 | | 6 | | 8 |
| JEFFAMINE M-2070 (%) | | 4 | | 6 | | 8 | | 4 | | 6 | |
| Paint Adhesion (%) | 14 | 42 | 56 | 53 | 80 | 40 | 65 | 50 | 52 | 43 | 92 |

TABLE 29B

TPO-BASED COMPOSITIONS

| | | | | | | | | | | | |
|---|---|---|---|---|---|---|---|---|---|---|---|
| Maleated-PP (%) | 10 | 10 | 15 | 15 | 15 | 20 | 20 | 20 | 20 | 20 | 20 | 20 |
| XTJ-418 (%) | 4 | | 6 | | 4 | | 6 | | 4 | | 6 | | 8 |
| JEFFAMINE M-2070 (%) | | | | 4 | | 6 | | 4 | | 6 | | 8 |
| Paint Adhesion (%) | 100 | 100 | 100 | 90 | 100 | 89 | 100 | 70 | 100 | 90 | 100 | 96 |

Example 29 demonstrates the superior paint adhesion achieved using the polyether monoamine of Example 28. It should be appreciated that XTJ-418 results in adhesion of up to 80% in Table 29A, whereas the adhesion for JEFFAMINE M-2070 did not produce adhesion above 53%. Furthermore, it should be appreciated that in the automotive industry, adhesion of less than 100% is considered unacceptable for commercial purposes.

GLOSSARY

JEFFAMINE M-1000

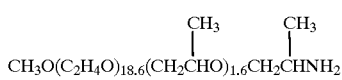

JEFFAMINE M-2070 and JEFFAMINE M-2005

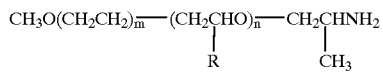

where R=H or $CH_3$, m is from about 3 to 32, and n is from about 10 to 32.

JEFFAMINE D-2000. JEFFAMINE D-4000 and JEFFAMINE D-400

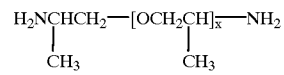

where x is about 33 for D-2000, x is about 68 for D-4000 and x is about 5.6 for D-400.

JEFFAMINE ED-600. JEFFAMINE ED-900. JEFFAMINE ED-2001. JEFFAMINE ED-4000, and JEEFFAMINE ED-6000

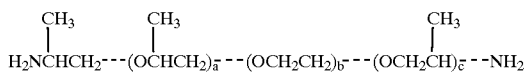

where b is about 8.5 and a+c is about 2.5 for ED-600, b is about 15.5 and a+c is about 2.5 for ED-900, b is about 40.5 and a+c is about 2.5 for ED-20-1, b is about 86.0 and a+c is about 2.5 for ED-4000, and b is about 132.0 and a+c is about 3.0 for ED-6000.

JEFFAMINE T-3000 and JEFFAMINE T-5000

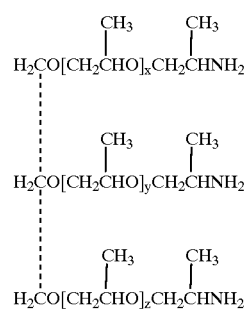

where x+y+z=50 for T-3000 and x+y+z=83 for T-5000.

JEFFAMINE ET-3000

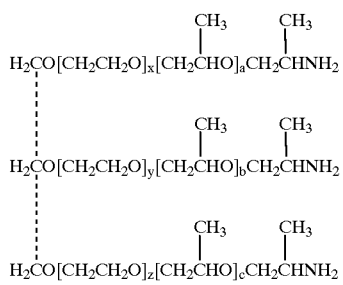

where x+y+z=57 and a+b+c=4.

We claim:

1. A composition, comprising: polypropylene and the reaction product of maleated polypropylene and a polyether monoamine which contains from about 36 to the polyether monoamine has a molecular weight of about 2000 to about 2200.

2. The composition of claim 1 wherein the polyether monoamine contains about 40 to about 43 ethylene oxide units and from 2.4 to about 3 propylene oxide units.

3. The composition of claim 1 wherein the polyether monoamine is of formula:

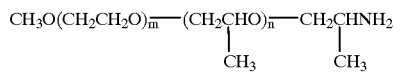

wherein m is about 36 to about 44, and wherein n is about 1 to about 6.

4. The composition of claim 3 wherein m is about 40 to 43 and n is from about 2.4 to about 6.

5. The composition of claim 1 wherein the composition is made by compounding the maleated polypropylene, the polyether monoamine, and the polypropylene in an extruder at a temperature of from about 175° C. to about 300° C. to react the maleated polypropylene and the polyether monoamine and to form the reaction product.

6. The composition of claim 1, wherein the composition further comprises a filler.

7. The composition of claim 1, wherein the composition further comprises a glass filler in an amount up to about 40 percent by weight.

8. The composition of claim 1, wherein the composition further comprises a talc filler.

9. The composition of claim 1, wherein the composition further comprises a carbon fiber filler.

10. The composition of claim 1, wherein the composition further comprises a stabilizer.

11. The composition of claim 10, wherein the stabilizer is a phenol.

12. The composition of claim 1, wherein the composition further comprises an elastomer.

13. The composition of claim 12, wherein the elastomer is an ethylene-propylene rubber.

14. The composition of claim 1, wherein the composition is made by (a) reacting the maleated polypropylene and the polyether monoamine to form a reaction product, (b) blending the reaction product with polypropylene in an extruder.

15. The composition of claim 1, wherein the polyether monoamine is made by ethoxylating methanol ethylene oxide to form an ethoxylate, propoxylating the ethoxylate with propylene carbonate to form a polyol, and aminating the polyol with ammonia in the presence of an alkylation catalyst.

16. The composition of claim 1 wherein the composition contains from about 5 percent to about 40 percent of the maleated polypropylene, and from about 2 to about 10 percent of the polyether monoamine.

17. The composition of claim 13, wherein the composition contains from about 5 percent to about 40 percent of the maleated polypropylene, and from about 2 to about 10 percent of the polyether monoamine.

* * * * *

UNITED STATES PATENT AND TRADEMARK OFFICE
CERTIFICATE OF CORRECTION

PATENT NO.    : 6,214,914 B1
DATED         : April 10, 2001
INVENTOR(S)   : Evans et al.

It is certified that error appears in the above-identified patent and that said Letters Patent is hereby corrected as shown below:

Column 31,
Line 19, please insert after "to" -- about 44 ethylene oxide units and from about 1 to about 6 propylene units, and wherein --.

Signed and Sealed this

Twenty-third Day of July, 2002

Attest:

JAMES E. ROGAN
Attesting Officer    Director of the United States Patent and Trademark Office